United States Patent
Shie

(10) Patent No.: US 7,986,391 B2
(45) Date of Patent: Jul. 26, 2011

(54) LIQUID CRYSTAL DISPLAY HAVING BRANCHED WIRING BETWEEN IC BONDING REGIONS AND FPC BONDING REGIONS

(75) Inventor: De-Ching Shie, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 1151 days.

(21) Appl. No.: 11/645,455

(22) Filed: Dec. 26, 2006

(65) Prior Publication Data

US 2007/0146614 A1 Jun. 28, 2007

(30) Foreign Application Priority Data

Dec. 23, 2005 (CN) .......................... 2005 1 0 121187

(51) Int. Cl.
*G02F 1/1345* (2006.01)

(52) U.S. Cl. ......... 349/150; 349/149; 349/151; 349/152

(58) Field of Classification Search ........... 349/149–152
See application file for complete search history.

(56) References Cited

U.S. PATENT DOCUMENTS

| | | | |
|---|---|---|---|
| 5,748,179 A * | 5/1998 | Ito et al. ...................... 349/152 |
| 7,139,060 B2 | 11/2006 | Cheng et al. |
| 2003/0067428 A1* | 4/2003 | Moon .............................. 345/87 |
| 2007/0034404 A1* | 2/2007 | Shin et al. ..................... 174/261 |

* cited by examiner

*Primary Examiner* — Brian M. Healy
*Assistant Examiner* — Michael Inadomi
(74) *Attorney, Agent, or Firm* — Wei Te Chung

(57) ABSTRACT

An exemplary liquid crystal display (50) includes plural integrated circuit bonding regions (51), plural flexible printed circuit bonding regions (52), and plural wires (53). Each of the wires includes a first branch (535) connecting to a corresponding one of the integrated circuit bonding regions, and two second branches (538). Each of the second branches connects between the first branch and a corresponding one of the flexible printed circuit bonding regions. The liquid crystal display can provide high reliability.

10 Claims, 2 Drawing Sheets

LIQUID CRYSTAL DISPLAY HAVING BRANCHED WIRING BETWEEN IC BONDING REGIONS AND FPC BONDING REGIONS

CROSS-REFERENCE TO RELATED APPLICATION

This application is related to, and claims the benefit of, a foreign priority application filed in China as Application No. 200510121187.1 on Dec. 23, 2005. The related application is incorporated herein by reference.

FIELD OF THE INVENTION

The present invention relates to liquid crystal displays (LCDs), and particularly to a liquid crystal display which has wires that are configured for mitigating the effects of electrostatic discharge (ESD) and thereby resisting damage.

GENERAL BACKGROUND

A typical LCD includes a plurality of ICs (integrated circuits) and an FPC (flexible printed circuit). The ICs are used for operating the LCD, and the FPC interconnects various electronic components and elements of the LCD. Nowadays, it is customary for the ICs and the FPC to be directly bonded onto a main substrate of the LCD via an ACF (anisotropic conductive film). Generally, bonding regions are pre-formed at the substrate, and a part of each of the bonding regions is electrically connected with one or more metal conducting wires.

Referring to FIG. 3, a typical substrate 10 of a liquid crystal display includes a plurality of driving IC bonding regions 11, a plurality of FPC bonding regions 12, and a plurality of metal conducting wires 13. The driving IC bonding regions 11 are used to bond one or more driving ICs thereat, and the FPC bonding regions 12 are used to bond an FPC thereat. Each of the driving IC bonding regions 11 is electrically coupled to a corresponding FPC bonding region 12 by a corresponding wire 13. A section of the wire 13 adjacent to the FPC bonding region 12 is trapezoidal-shaped, and tapers from the FPC bonding region 12 toward the driving IC bonding region 11. A section of the wire 13 adjacent to the driving IC bonding region 11 is rectangular, and has a uniform width. Any transverse width of the trapezoidal-shaped section of the wire 13 is greater than the width of the rectangular section of the wire 13. A joint portion 131 is defined where the trapezoidal-shaped section of the wire 13 meets the rectangular section of the wire 13.

When electrostatic discharge (ESD) occurs in the liquid crystal display, electric charges are liable to transfer between the FPC bonding regions 12 and corresponding driving IC bonding regions 11 via the wires 13. The joint portions 131 interconnecting the trapezoidal-shaped sections and the rectangular sections of the wires 13 are the equivalent of electrical path resistive "bottlenecks". That is, when electric charges transfer from the trapezoidal-shaped sections to the rectangular sections, the electric charges are prone to concentrate at the joint portions 131. When this happens, the wires 13 are liable to burn out and break the corresponding circuits. Therefore, the liquid crystal display with the substrate 10 may have poor reliability.

Accordingly, what is needed is a liquid crystal display that can overcome the above-described deficiencies.

SUMMARY

In one preferred embodiment, a liquid crystal display includes a plurality of integrated circuit bonding regions, a plurality of flexible printed circuit bonding regions, and a plurality of wires. Each of the wires includes a first branch connecting to a corresponding one of the integrated circuit bonding regions, and at least two second branches. Each of the at least two second branches connects between the first branch and a corresponding one of the flexible printed circuit bonding regions.

Other advantages and novel features will become more apparent from the following detailed description when taken in conjunction with the accompanying drawings.

DETAILED DESCRIPTION OF PREFERRED EMBODIMENTS

Figure 1:
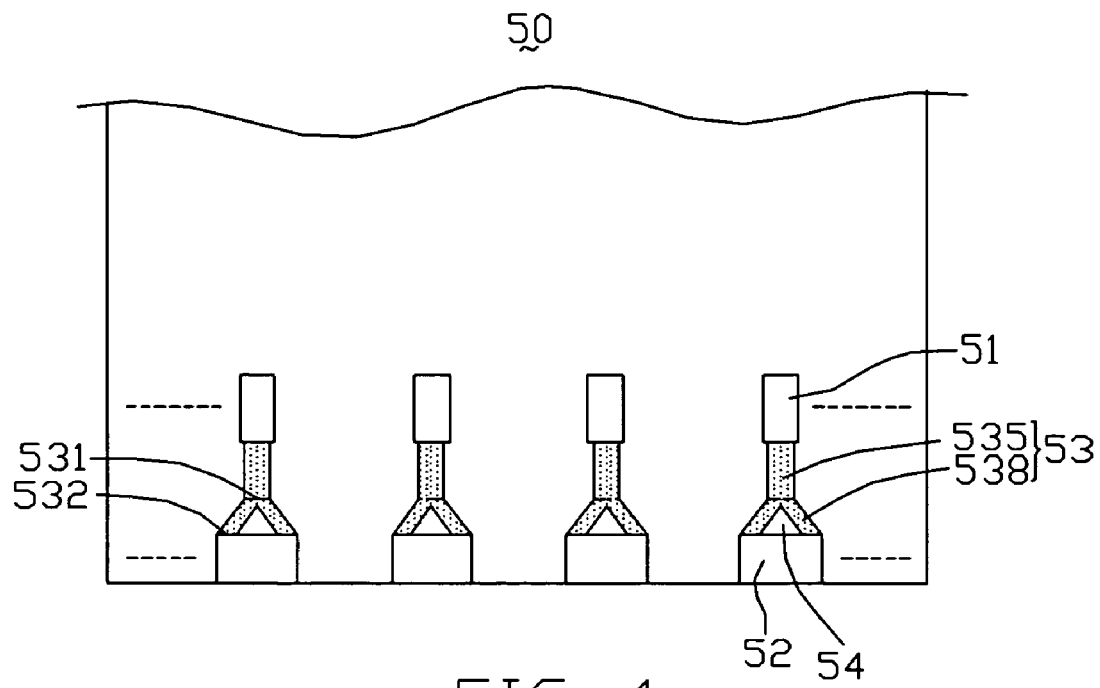
FIG. 1 is an abbreviated, top plan view of part of a liquid crystal display according to a first embodiment of the present invention.

Referring to FIG. 1, an abbreviated, top plan view of part of a liquid crystal display according to a first embodiment of the present invention is shown. The liquid crystal display 50 includes a plurality of driving IC bonding regions 51, a plurality of FPC bonding regions 52, and a plurality of metal conducting wires 53. The driving IC bonding regions 51 are used to bond one or more driving ICs thereat, and the FPC bonding regions 52 are used to bond an FPC thereat. Each of the driving IC bonding regions 51 is electrically coupled to a corresponding FPC bonding region 52 by a corresponding wire 53.

Each driving IC bonding region 51 has a rectangular shape. Each wire 53 includes a first branch 535 and two second branches 538. A sum of widths of the second branches 538 is greater than a width of the first branch 535. The first branch 535 is connected to the corresponding IC bonding region 51. Each second branch 538 includes a first end (not labeled) and a second end (not labeled). The first ends of the second branches 538 are connected with the first branch 535, thus defining a first joint portion 531. The second ends of the second branches 538 are respectively connected to the corresponding FPC bonding region 52, thus defining two second joint portions 532. A triangular space 54 is defined between the second branches 538 and the FPC bonding region 52. More particularly, the second branches 538 are substantially separated from each other.

Figure 2:
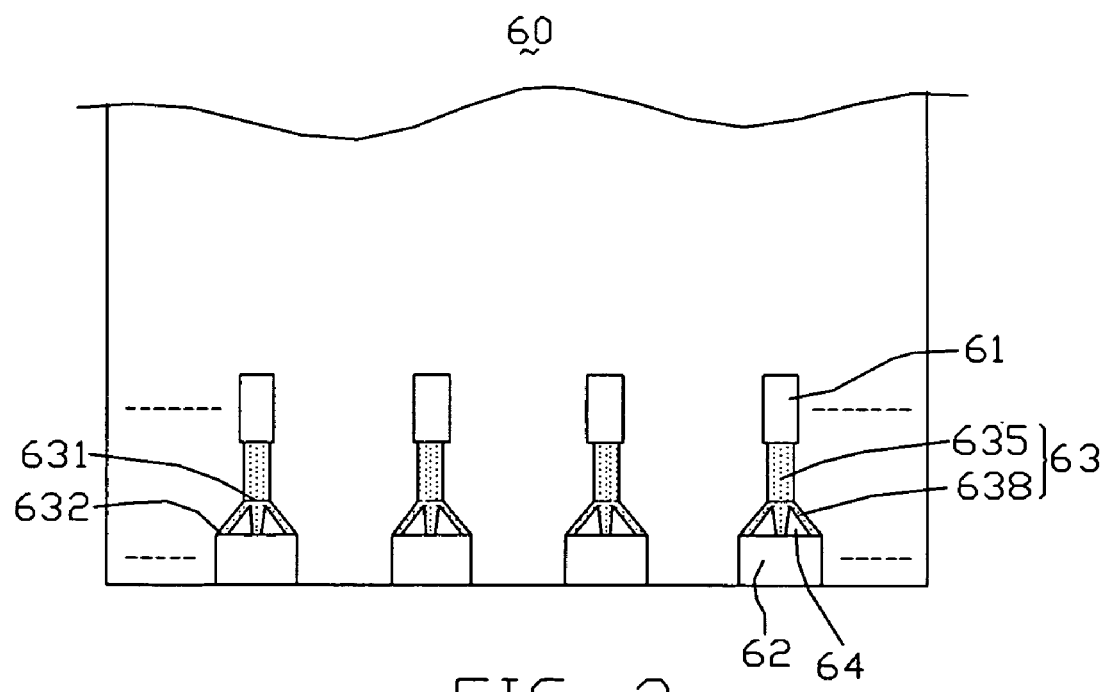
FIG. 2 is an abbreviated, top plan view of part of a liquid crystal display according to a second embodiment of the present invention.
Figure 3:
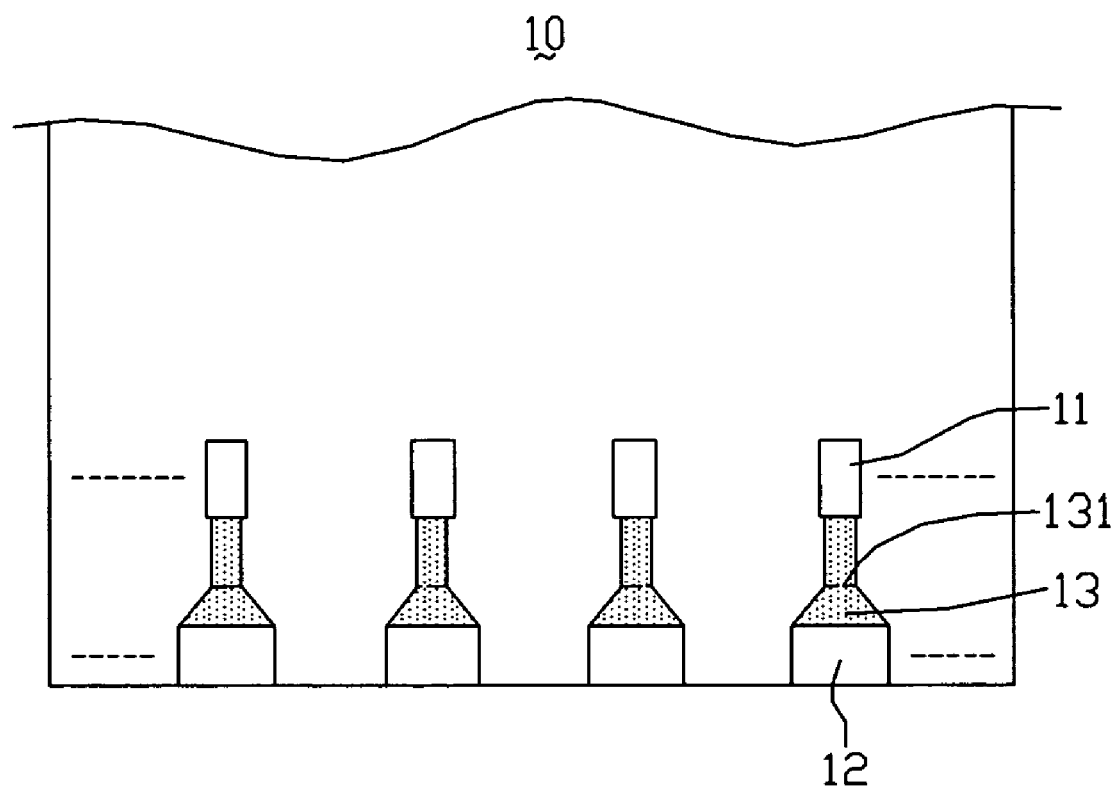
FIG. 3 is an abbreviated, top plan view of part of a substrate of a conventional liquid crystal display.

Referring to FIG. 2, an abbreviated, top plan view of part of a liquid crystal display according to a second embodiment of the present invention is shown. The liquid crystal display 60 includes a plurality of driving IC bonding regions 61, a plurality of FPC bonding regions 62, and a plurality of metal conducting wires 63. The driving IC bonding regions 61 are used to bond one or more driving ICs thereat, and the FPC bonding regions 62 are used to bond an FPC thereat. Each of the driving IC bonding regions 61 is electrically coupled to a corresponding FPC bonding region 62 by a corresponding wire 63.

Each wire 63 includes a first branch 635 and three second branches 638. A sum of widths of the second branches 638 is greater than a width of the first branch 635. The first branch 635 is connected to the corresponding IC bonding region 61. Each second branch 638 includes a first end (not labeled) and a second end (not labeled). The first ends of the second branches 638 are connected with the first branch 635, thus defining a first joint portion 631. The second ends of the second branches 638 are respectively connected to the corresponding FPC bonding region 62, thus defining three second joint portions 532. Two triangular spaces 64 are defined between the adjacent second branches 638. More particularly, the second branches 638 are substantially separated from each other.

Unlike with a conventional liquid crystal display, each of the wires 53, 63 includes two or three second branches 538, 638 connected with the corresponding FPC bonding region 52, 62. When electric charges generated by ESD transfer from the FPC bonding region 52, 62 to the corresponding IC bonding region 51, 61 via the second joint portions 532, 632, the electric charges are divided into two or three portions. Thus, the second joint portions 532, 632 are protected from burning out. Because many or most electric charges discharge over the two or three second joint portions 532, 632, relatively few electric charges transfer through to the first joint portion 531, 631. Thus, the first joint portion 531, 631 is also protected from burning out. Consequentially, the driving IC bonding region 51, 61 is also protected from burning out. For these reasons, the liquid crystal display 50, 60 can provide high reliability.

Further or alternative embodiments may include the following. In one example, the wires can each include more than three second branches. In another example, the triangular spaces 54, 64 can instead be rectangular or curved or have another suitable shape.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display comprising:
a plurality of integrated circuit bonding regions;
a plurality of flexible printed circuit bonding regions; and
a plurality of wires;
wherein each of the integrated circuit bonding regions is electrically coupled to a corresponding one of the flexible printed circuit bonding regions by a corresponding one of the wires, and each of the wires has a "Y" shape and defines at least one space therein.

2. The liquid crystal display as claimed in claim 1, wherein the width of each wire near the flexible printed circuit bonding region is greater than the width of the wire near the integrated circuit bonding region.

3. A liquid crystal display, comprising:
a plurality of integrated circuit bonding regions;
a plurality of flexible printed circuit bonding regions; and
a plurality of wires;
wherein each of the integrated circuit bonding regions is electrically coupled to a respective one of the flexible printed circuit bonding regions only by one of the wires, the wires are disposed between the integrated circuit bonding regions and the flexible printed circuit bonding regions, each wire comprises a first branch having only two ends, one of the two ends is connected to a corresponding integrated circuit bonding region, and at the other end of the first branch, the first branch is divided into at least two second branches separated from each other, ends of the at least two second branches connected to a corresponding flexible printed circuit bonding region, and a sum of widths of the at least two second branches is greater than a width of the first branch.

4. The liquid crystal display as claimed in claim 3, wherein each of the wires has a "Y" shape.

5. A liquid crystal display comprising:
a plurality of integrated circuit bonding regions;
a plurality of flexible printed circuit bonding regions; and
a plurality of wires;
wherein each of the integrated circuit bonding regions is electrically coupled to a respective one of the flexible printed circuit bonding regions only by one of the wires, the wires are disposed between the integrated circuit bonding regions and the flexible printed circuit bonding regions, each of the wires comprises a node disposed between the integrated circuit bonding regions and the flexible printed circuit bonding regions, and at least three branches radiated from the node, wherein one of the at least three branches extends towards a corresponding integrated circuit bonding region and is connected to the corresponding integrated circuit bonding region, and all other branches of the at least three branches radiate towards a corresponding flexible printed circuit bonding region and are connected to the corresponding flexible printed circuit bonding region.

6. The liquid crystal display as claimed in claim 5, wherein the at least three branches is three branches.

7. The liquid crystal display as claimed in claim 6, wherein a sum of widths of the other of the at least three branches connected to the corresponding flexible printed circuit bonding region is greater than a width of the branch connected to the corresponding integrated circuit bonding region.

8. The liquid crystal display as claimed in claim 5, wherein the other of the at least three branches of each wire which are connected to the corresponding flexible printed circuit bonding region and the corresponding flexible printed circuit bonding region define at least one space therebetween.

9. The liquid crystal display as claimed in claim 8, wherein the at least one space is triangular, rectangular, or curved.

10. The liquid crystal display as claimed in claim 8, wherein each of the wires has a "Y" shape.

* * * * *